US010766430B2

(12) United States Patent
Frederick et al.

(10) Patent No.: US 10,766,430 B2
(45) Date of Patent: Sep. 8, 2020

(54) AUTONOMOUS REAR VIEWING SENSOR MOUNT (71) Applicant: Toyota Motor Engineering & Manufacturing North America, Inc., Plano, TX (US)

(72) Inventors: Scott L Frederick, Brighton, MI (US); Andrew L Sakowski, Northville, MI (US); Bill Castleman, Canton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/040,909

(22) Filed: Jul. 20, 2018

(65) Prior Publication Data
US 2020/0023788 A1  Jan. 23, 2020

(51) Int. Cl.
*B60R 11/00* (2006.01)
*G01S 7/02* (2006.01)
*G01S 7/481* (2006.01)

(52) U.S. Cl.
CPC ............... *B60R 11/00* (2013.01); *G01S 7/02* (2013.01); *G01S 7/4813* (2013.01); *B60R 2011/004* (2013.01); *G01S 2007/027* (2013.01)

(58) Field of Classification Search
CPC . B60R 11/00; B60R 2011/004; G01S 7/4813; G01S 7/02; G01S 2007/027
USPC ........................................ 248/237, 542, 904
See application file for complete search history.

(56) References Cited

U.S. PATENT DOCUMENTS

| 9,575,184 | B2 | 2/2017 | Gilliland et al. | |
| 10,099,630 | B1* | 10/2018 | Krishnan | E05F 15/443 |
| 10,302,744 | B1* | 5/2019 | Krishnan | G01S 17/04 |
| 2006/0066835 | A1 | 3/2006 | Laufer et al. | |
| 2012/0050534 | A1 | 3/2012 | Totani | |
| 2016/0282155 | A1 | 9/2016 | Hara | |
| 2017/0190300 | A1* | 7/2017 | Maranville | B60R 11/00 |
| 2017/0305360 | A1 | 10/2017 | Zajac | |
| 2017/0369003 | A1* | 12/2017 | Williams | B60J 1/02 |
| 2018/0003529 | A1* | 1/2018 | Ko | G01S 7/4817 |
| 2018/0015886 | A1* | 1/2018 | Frank | B60R 13/06 |
| 2018/0037267 | A1* | 2/2018 | Williams | G01S 13/931 |
| 2019/0077376 | A1* | 3/2019 | Baldovino | B60S 1/52 |
| 2019/0168671 | A1* | 6/2019 | Higashimachi | B60R 1/12 |
| 2019/0184942 | A1* | 6/2019 | Vaishnav | B60S 1/566 |
| 2019/0204426 | A1* | 7/2019 | Vaishnav | G01S 7/4813 |
| 2019/0210436 | A1* | 7/2019 | Frederick | B62D 25/06 |
| 2019/0278078 | A1* | 9/2019 | Krishnan | H04N 5/2252 |
| 2019/0315409 | A1* | 10/2019 | Ghannam | B60R 11/00 |
| 2020/0023788 | A1* | 1/2020 | Frederick | B60R 11/00 |

FOREIGN PATENT DOCUMENTS

EP  2 361 806 A2  1/2011

* cited by examiner

*Primary Examiner* — Muhammad Ijaz
(74) *Attorney, Agent, or Firm* — Oblon, McClelland, Maier & Neustadt, L.L.P.

(57) ABSTRACT

Autonomous vehicles are made by fitting sensors to non-autonomous vehicle platforms. A mounting structure to mount rear-facing sensors to the vehicle is needed to provide sensor data about the rear environment of the vehicle. The mounting structure is secured to the vehicle by utilizing existing vehicle body structures. The vehicle body structures include rearward roof chassis parts that provide stability and security to the mounting structure.

18 Claims, 8 Drawing Sheets

AUTONOMOUS REAR VIEWING SENSOR MOUNT

BACKGROUND

Technical Field

The present disclosure relates to a mounting structure for a rear viewing sensor on a vehicle having an automated driving system.

Related Art

In autonomous vehicles, sensors are necessary to determine the environment within which the vehicle is operating. Autonomous vehicles often begin as normal, non-autonomously driving, vehicles that are retrofitted with parts necessary for autonomous driving. For ease of installation, mounts and other apparatuses are used to retrofit vehicles with autonomous vehicle devices and parts. Those mounts and other apparatuses have, often utilized non-chassis outer body parts of those vehicles as supports.

However, using non-chassis components in non-ideal locations of a vehicle may result in limited sensor capabilities, reduced weight capacity of the mounts, and increased introduction of noise to sensor data due to a lack of stability. Accordingly, due to sensor directionality, ideal mounting points for the sensors are at or near the highest point of the vehicle for more visibility and mounted to the chassis of the vehicle for stability.

SUMMARY

Therefore, it is an object of the present disclosure to provide a mounting structure for a rear-viewing sensor of an autonomous vehicle.

In order to achieve the above-described object, the mounting structure for a rear-viewing sensor of an autonomous vehicle according to a first aspect of the present invention is a bracket fit to the vehicle at an existing rear body structure of the vehicle, wherein the bracket includes mounts for sensors including at least one of a light detection and ranging sensor (lidar) and radio detection and ranging sensor (radar), and wherein the mounts place the sensors in a rear-facing direction of the vehicle.

BRIEF DESCRIPTION OF THE DRAWINGS

Exemplary embodiments of the present disclosure will be described in detail based on the following figures, wherein.

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "front," "side," "height," "width," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

Referring now to the drawings, wherein like reference numerals designate identical or corresponding parts throughout the several views.

Hereinafter, exemplary embodiments of the present disclosure will be described in detail based on the drawings. Unless specifically stated otherwise, if simple up-down, front-rear, or left-right directions are used in the following description, then these refer respectively to the up-down direction of the vehicle body, the front-rear direction of the vehicle body, and the left-right direction of the vehicle body (i.e., the vehicle transverse direction).

Figure 1A:
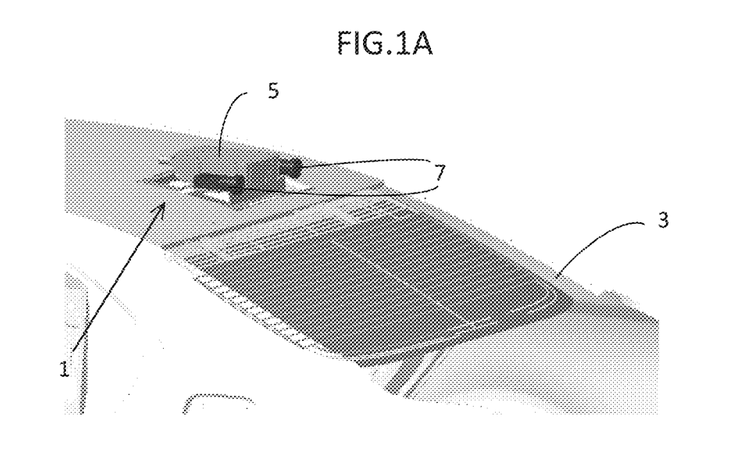
FIG. 1A is a perspective view showing, a mounting structure with a sensors on a vehicle, according to a first exemplary embodiment.

In a first embodiment, sensors are mounted to a vehicle 3 via a mounting structure 1 in a rear-viewing direction. As is shown in FIG. 1A, a perspective view showing the mounting structure 1 with the sensors (e.g., lidar or radar 5 and cameras 7) on a vehicle 3, according to a first exemplary embodiment. Although, in the first exemplary embodiment, the vehicle is a sedan type vehicle platform, vehicles for attaching the mounting structure may include any transportation method which could be converted to autonomous vehicles. The transportation methods may include any automobiles, vans, buses, trucks, sport utility vehicles, motorcycles, etc. Further, in other exemplary embodiments, the mounting structure 1 is modular for different sets of rear-facing sensors such as other combinations of large/longer range sensors (e.g., lidar and radar) 5 and smaller/shorter range sensors (cameras and ultrasonic sensors) 7. Further, as seen in the first exemplary embodiment, the use of cameras as smaller sensors is often as a pair, for stereoscopic vision. The mounting structure 1 may include any combinations of mounts to a plurality of large sensors 5 and/or a plurality of small sensors 7 based on the size of the mounting structure 1. In the first exemplary embodiment, the mounting structure 1 is located above the rear windshield on the roof of the vehicle and places the sensors 5 and 7 in a rear-facing position to view the environment toward the back of the vehicle.

Figure 1B:
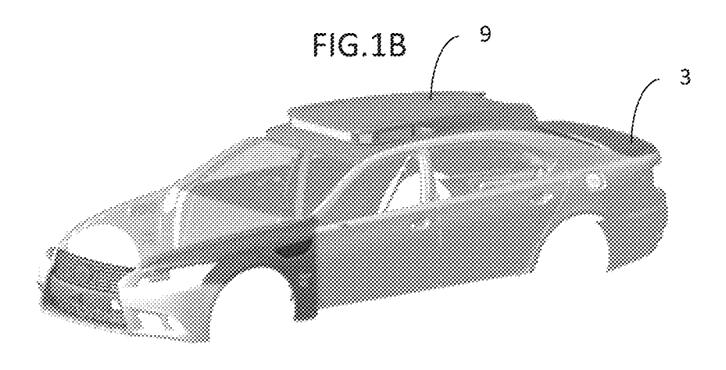
FIG. 1B is a perspective view showing a cover over the mounting structure on the vehicle, according to the first exemplary embodiment.

As is shown in FIG. 1B, a perspective view showing a cover over the mounting structure on the vehicle, according to the first exemplary embodiment. In the first exemplary embodiment the cover 9 protects the mounting structure 1 and sensors 5 and 7 from the environment elements (e.g., water, dirt, dust, etc.). In the first exemplary embodiment, cover 9 protects the mounting structure land sensors 5 and 7 by attaching to the roof of the vehicle 3. The cover 9 also retains the ability to allow the sensors 5 and 7 to collect environmental data. The cover 9 may include unobstructed viewing portals for viewing the vehicle rear surrounding environment. The cover 9 may be made of different materials to protect the mounting structure 1 in different locations from different environmental element. For example, the side and front facing portions may be made from thicker and light or shiny colored materials to disperse heat and clear materials for the rear facing portions for the sensors 5 and 7 to collect information through. The cover 9 may include portions made from a membrane material that is hydrophobic to the environment but is permeable by water and air from the mounting structure 1 interior.

In the first exemplary embodiment, the cover 9 covers a larger portion of the roof than necessary in order to cover the mounting structure 1 as well as other front facing mounting structures to provide sensor data for at least the front of the vehicle. In other exemplary embodiments, the cover 9 may seal to peripheral parts of the mounting structure 1. In other exemplary embodiments, the cover 9 may also protect only the mounting structure 1 and sensors 5 and 7 by covering only the mounting structure above the roof of the vehicle.

Finally, in yet another exemplary embodiment, in instances where the sensors include their own protective cases, the mounting structure 1 may be used without a cover.

Figure 2A:
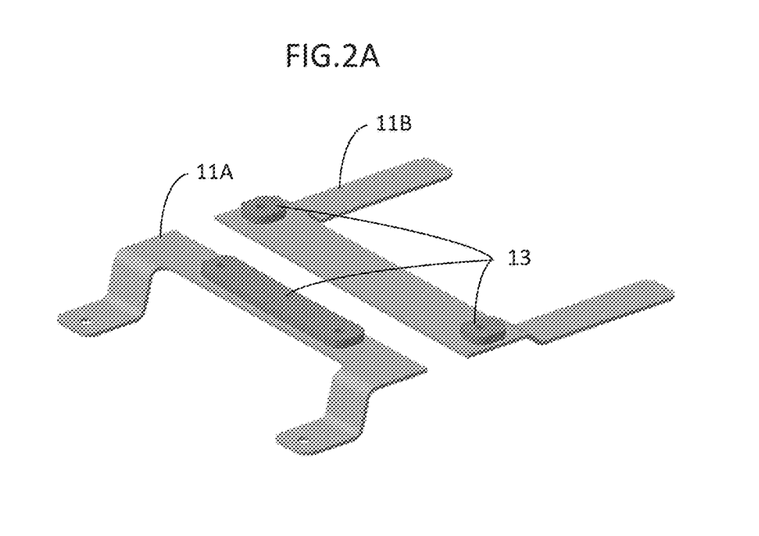
FIG. 2A is a perspective view showing reinforcement plate connections of the mounting structure, according to the first exemplary embodiment.
Figure 2B:
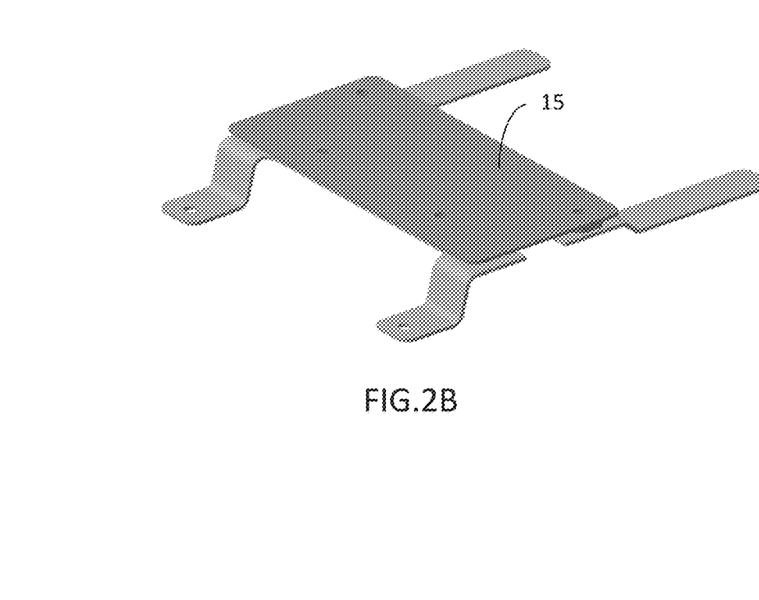
FIG. 2B is perspective view showing the reinforcement plate connections and mounting plate of the mounting structure, according to the first exemplary embodiment
Figure 2C:
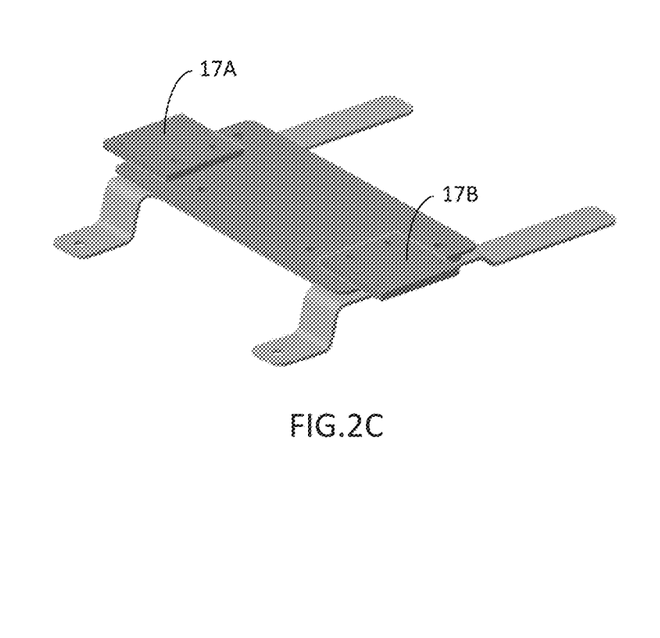
FIG. 2C is perspective view showing the reinforcement plate connections, mounting plate, and sensor mounts, according to the first exemplary embodiment.

As shown in FIGS. 2A-2C, perspective views showing reinforcement plate connections 11A and 11B, mounting plate 15, and sensor mounts 17A and 17B of the mounting structure 1, according to the first exemplary embodiment. Specifically, FIG. 2A shows a perspective view of the reinforcement plate connections 11A and 11B of the mounting structure 1 for attachment of the sensors 5 and 7 to the vehicle chassis. The arms of the reinforcement plate connections 11A and 11B extending out from the main body of the mounting structure 1 are used to attach the mounting structure 1 to the vehicle chassis. Reinforcement plate connection 11A is more bent in an s-shape than reinforcement plate connection 11B. Reinforcement plate connection 11A faces more rearward on the vehicle 3, than reinforcement plate connection 11B. Further, the size of the s-shapes of reinforcement plate connections 11A and 11B may determine a pitch angle of the sensors. The pitch angle is generally level, however, based on sensor capabilities (which may limit viewing angles), the sensors may optimally be pitched away from level to the ground, to be angled toward the ground. In other exemplary embodiments, the pitch angle will determine the s-shapes of the reinforcement place connections 11A and 11B.

Additionally, the reinforcement plate connections 11A and 11B may also include spacers 13 for providing a smooth surface to distribute attachment pressure to a mounting plate 15 as seen in FIG. 2B. The mounting plate 15 is used as a mounting location for larger sensors 5 such as a lidar or radar. Further, as shown in FIG. 2C, the additional sensor mounts 17A and 17B may be attached to the mounting structure 1, at the mounting plate 15 or the reinforcement plate connections 11A and 11B. In other exemplary embodiments, the spacers may add to or provide for the aforementioned pitch angle by including thicker and thinner spacers to either of the reinforcement plate connections 11A and 11B. For example, including thicker spacers to reinforcement plate connection 11B than reinforcement plate connection 11A will angle the sensors toward the ground.

Although, in the first exemplary embodiment, the arms of the reinforcement plate connections 11A and 11B are more bent on reinforcement plate connection 11A than reinforcement plate connection 11B, the arms may take any shape that provides attachment means to two different parts of the rearward vehicle chassis. In other exemplary embodiments, the shape of the plate connections 11A and 11B may vary based on the pitch between the vehicle chassis attachment points to mount the sensors on the mounting structure 1 parallel or close to parallel to the ground when the vehicle is level. Further, in other exemplary embodiments, the reinforcement plate connections 11A and 11B may be extendable with an extension means to fit a plurality of existing vehicle platforms. The extension means may include sliding or fixed extension arms attached to the reinforcement plate connections 11A and 11B with bolts, notches, etc.

Figure 3:
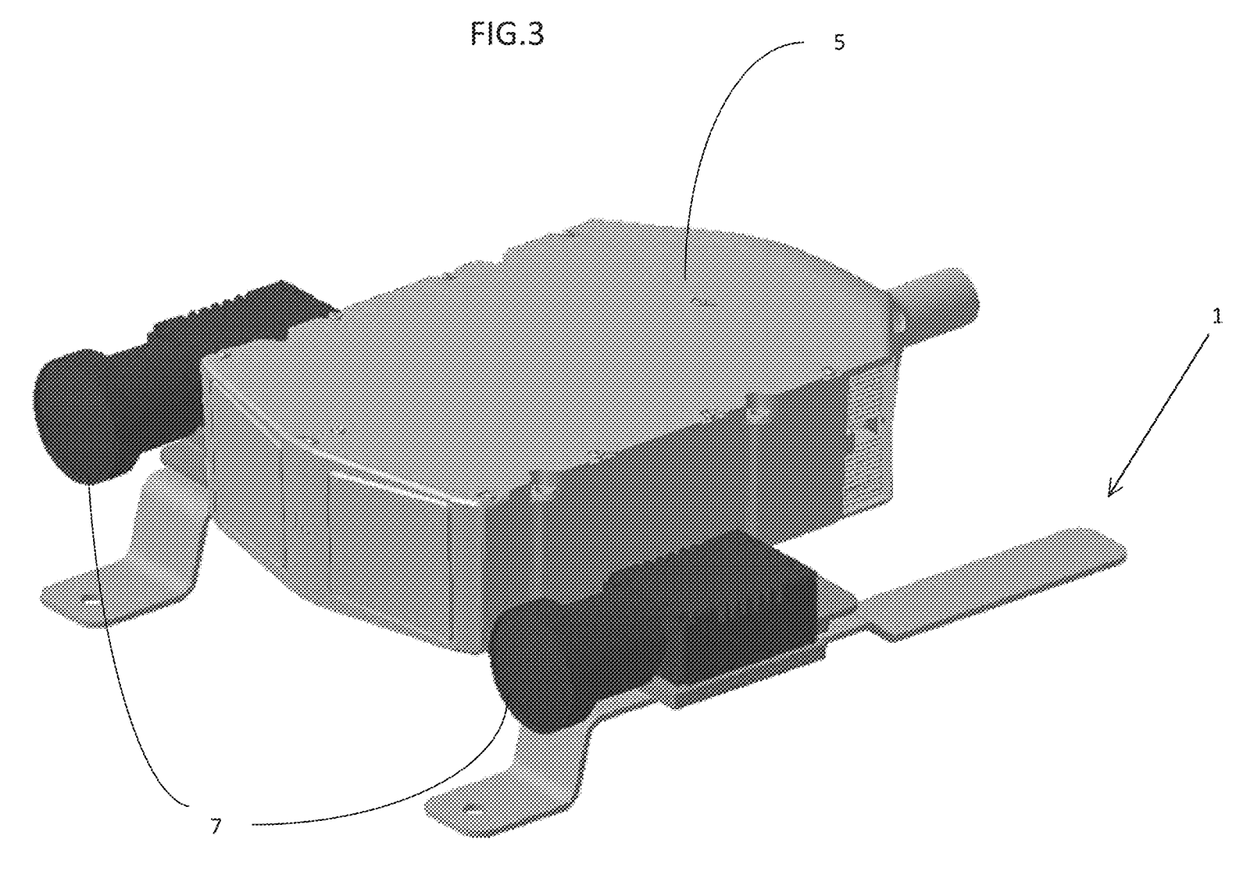
FIG. 3 is a perspective view showing the mounting structure with the sensors mounted, according to the first exemplary embodiment.

As shown in FIG. 3, a perspective view showing the mounting structure 1 with the sensors 5 and 7 mounted, according to the first exemplary embodiment. As seen, sensor 5 is a large sensor that may include a lidar or radar and sensors 7 may be cameras or other smaller sensors (e.g., other environmental sensors, such as thermometers, barometers, etc.). The smaller sensors may be attached to the sensor mounts 17A and 17B.

The attachment means between the reinforcement plate connections 11A and 11B and the vehicle chassis may include any number of mechanisms (e.g., screws, bolts, rivets, latches, interconnecting grooves, adhesive, etc.). The attachment means between parts of the mounting structure 1, including reinforcement plate connections 11A and 11B, spacers 13, mounting plate 15, and sensor mounts 17A and 17B may include the same or different mechanisms to provide stable and secure attachments throughout the mounting structure 1.

Figure 4:
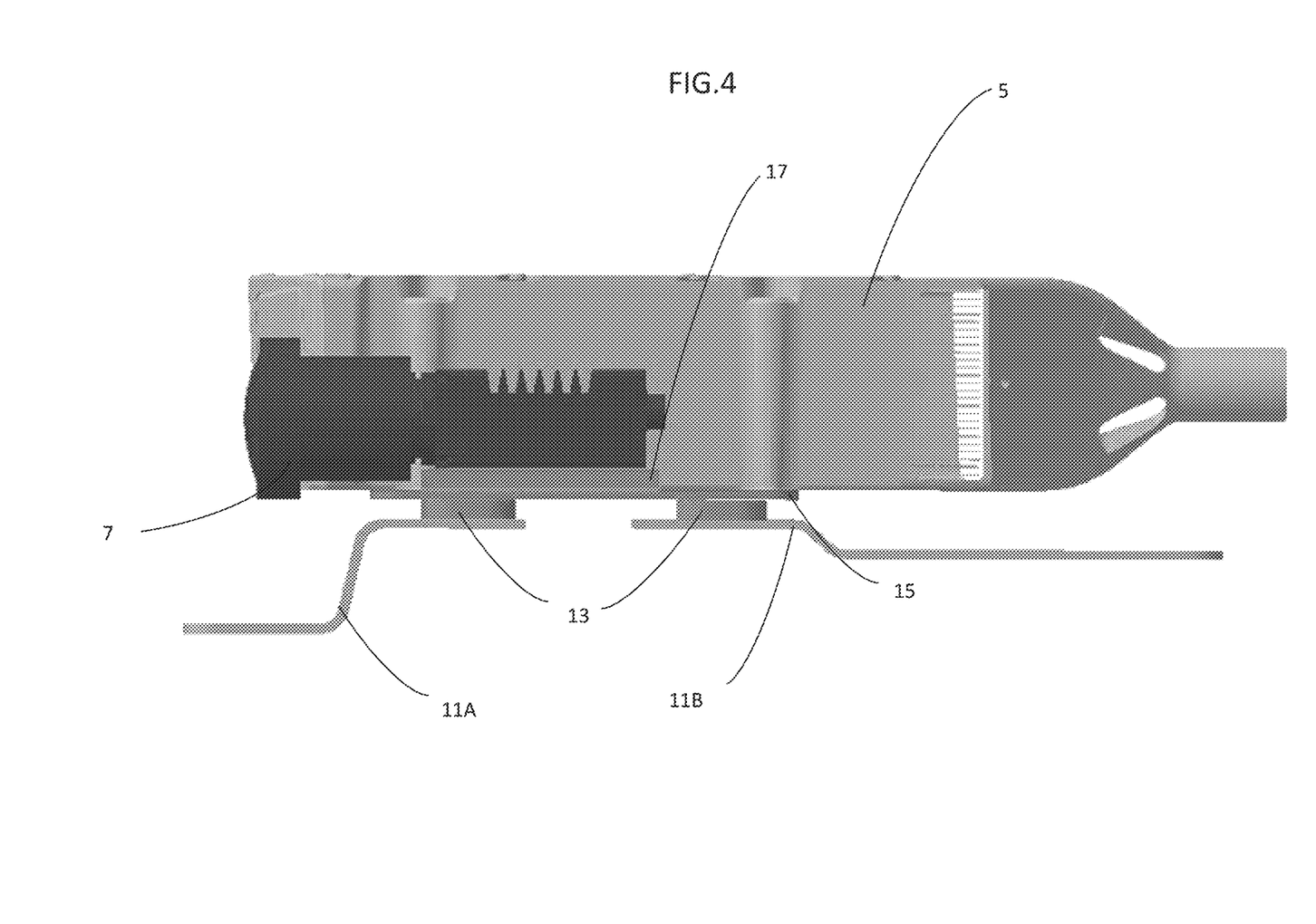
FIG. 4 is a side view showing the mounting structure with sensors mounted, according to the first exemplary embodiment.
Figure 5:
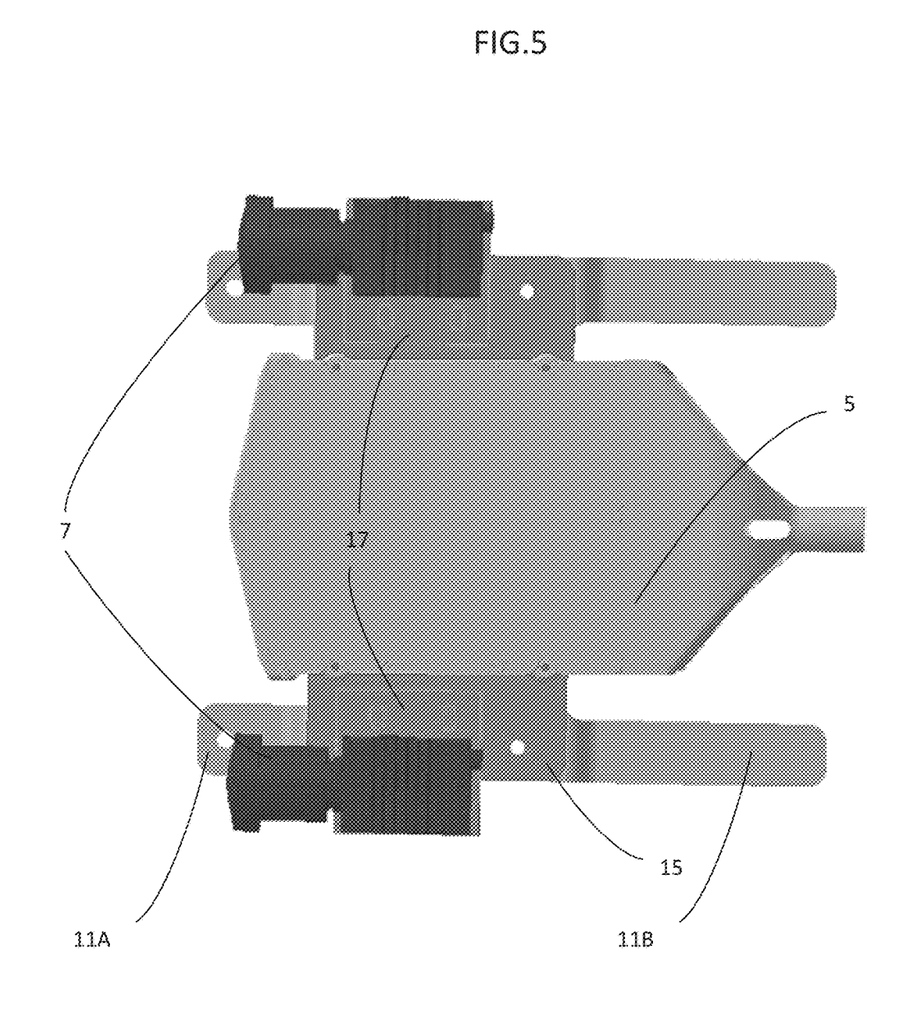
FIG. 5 is a top view showing the mounting structure with the sensors mounted, according to the first exemplary embodiment.
Figure 6:
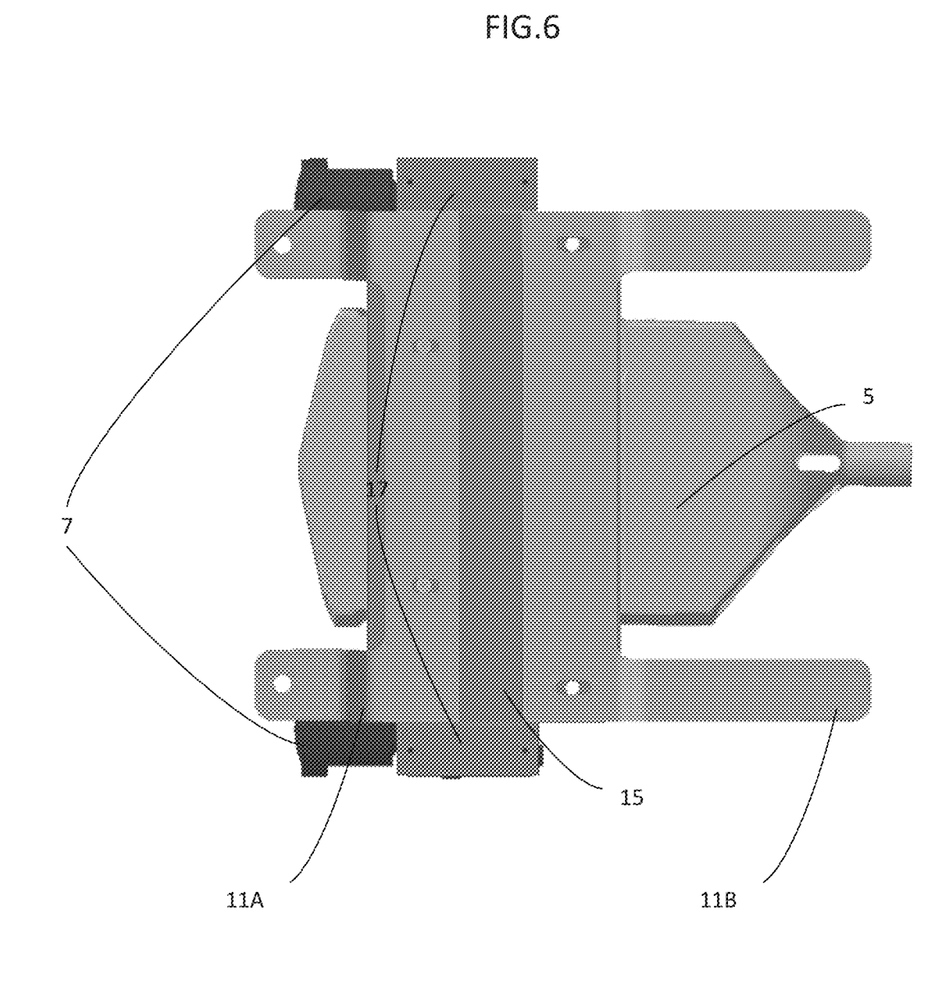
FIG. 6 is a bottom view showing the mounting structure with the sensors mounted, according to the first exemplary embodiment.

The side view of the same mounting structure with sensors mounted, is shown in FIG. 4. The parts (i.e., spacers 13, sensor mounts 17A and 17B, mounting plate 15, and reinforcement plate connections 11A and 11B) of the mounting structure 1 are shown in their fixed state. As seen, the cameras 7 are attached to the sensor mounts 17. The sensor mounts 17 are attached to the mounting plate 15. The reinforcement plate connections 11A and 11B are attached to the mounting plate 15 with the spacers 13 providing some separation between the reinforcement plate connections 11A and 11B and the mounting plate 15. Additionally, the top view (FIG. 5) and bottom view (FIG. 6) of the same mounting structure 1 with the sensors mounted, according to the first exemplary embodiment, is shown.

Figure 7A:
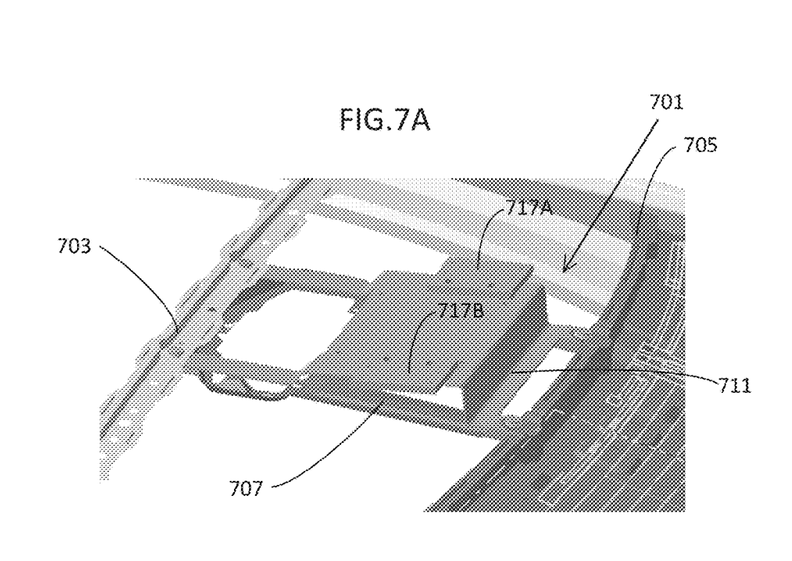
FIG. 7A is a perspective view showing a mounting structure mounted to a vehicle chassis, according to a second exemplary embodiment.

As shown in FIG. 7A, a perspective view showing a mounting structure fixed to a vehicle chassis is described according to a second exemplary embodiment. The mounting structure 701 is attached to the vehicle chassis on the rearward roof of the vehicle to place the mount at a higher, rearward point of the vehicle. The height and rearward placement provides the sensors 5 with an open and less obstructed view of the rear environment of the vehicle.

In the second exemplary embodiment, the mounting structure 701 is attached to the vehicle chassis at a roof bow reinforcement 703 and rear header reinforcement 705 to provide a sturdy and stable attachment location. To access the parts of the vehicle chassis, a section of the exterior roof of the vehicle 3 is removed by cutting the roof outer panel open. The removed portion of the roof outer panel is often limited to the general size and shape of the mounting structure 701 in order to limit exposure of the inside of the vehicle 3 to environmental elements. However, in other exemplary embodiments, the cut out portion of the roof outer panel is larger than the mounting structure 701 to provide access from the interior of the vehicle and/or clearance to the largest sensors available for mounting. Access from the interior of the vehicle 3 may be provided so that users do not have to be exposed to the elements when modifying, fixing, or adjusting the mounting structure 1 and sensors 5 and 7. Access from the interior of the vehicle 3 may also be provided to prevent the need to re-sealing of the cover 9 to the vehicle roof outer panel.

Further, in other exemplary embodiments the mounting structure 701 may be attached to other parts of the vehicle chassis as long as the location is stable, rearward and near the highest point of the vehicle 3. In the second exemplary embodiment, the mounting structure 701 is placed above a headliner console reinforcement 707. The headliner console reinforcement 707 pre-exists in the vehicle 3 and may provide access to the mounting structure 701 from the interior of the vehicle 3

In the second exemplary embodiment, the mounting structure 701 includes a mounting plate 711 which may be a single piece with the reinforcement plate connections. The mounting plate 711 is attached to the vehicle chassis at attachment points along the roof bow reinforcement 703 and rear header reinforcement 705. The attachment points along the roof bow reinforcement 703 and rear header reinforcement 705 are determined by the size and shape of the mounting structure 701. The attachment points may include pre-existing or newly created mounting points on the roof bow reinforcement 703 and rear header reinforcement 705. Further, the mounting plate 711 may be attached to the vehicle chassis through any of the attachment means above.

Figure 7B:
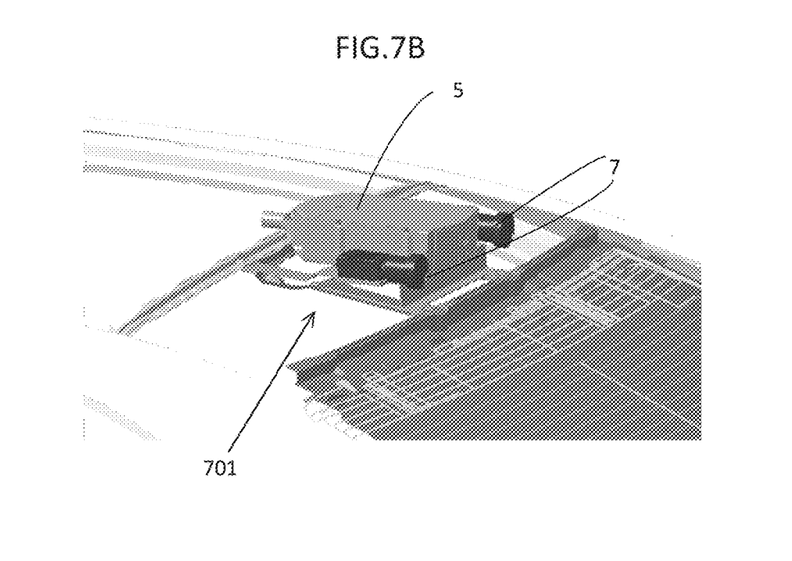
FIG. 7B is a perspective view showing the mounting structure with sensors mounted to the vehicle chassis, according to the second exemplary embodiment.

As shown in FIG. 7B, a perspective view showing the mounting structure with sensors mounted to the vehicle chassis, according to the second exemplary embodiment. The sensors 5 and 7 are shown mounted to the mounting structure 701. The lidar/radar sensor 5 and cameras 7 are placed in a rear-facing direction, at the rear roof and near the back windshield of the vehicle 3, to collect sensor data on everything in the rear of vehicle 3.

Figure 8:
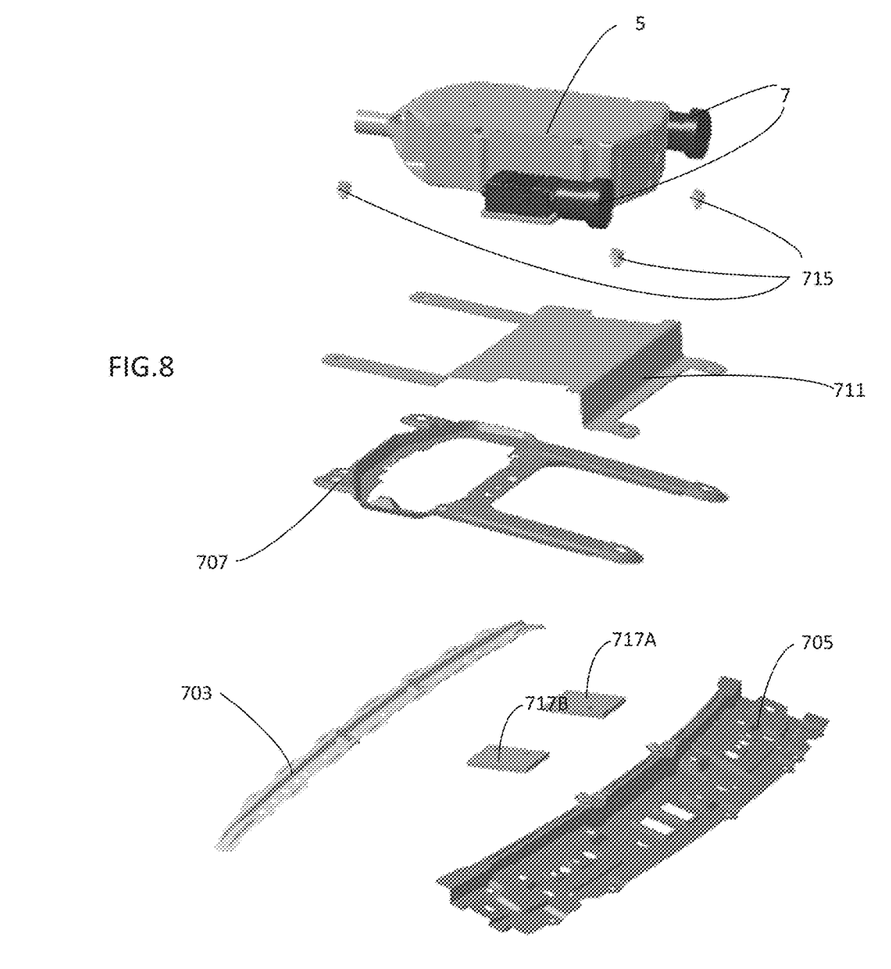
FIG. 8 is a perspective view showing an exploded version of the mounting structure with the sensors and vehicle chassis parts, according to the second exemplary embodiment.

As shown in FIG. 8, a perspective view showing an exploded version of the mounting structure with the sensors and vehicle chassis parts, according to the second exemplary embodiment. The vehicle chassis parts of the roof include the roof bow reinforcement 703 and rear header reinforcement 705. The headliner console 707, connected to the interior of vehicle 3, is a pre-existing part of the vehicle and in other exemplary embodiments, may not exist. The mounting structure 711 and headliner console 707 are attached by attachment means 715 (e.g., screws, bolts, rivets, latches, interconnecting grooves, adhesive, etc.), to the vehicle chassis parts, the roof bow reinforcement 703 and rear header reinforcement 705. In other exemplary embodiments, the mounting structure 711 may be attached to other parts of the vehicle chassis and provide greater stability and security than attachment to non-chassis outer vehicle parts. In the second exemplary embodiment, the sensor mounts 717A and 717B are attached as part of the mounting structure 711 to mount the cameras 7. The lidar/radar large sensor 5 is directly mounted to the mounting structure 711 and does not have a separate sensor mount.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other exemplary embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

What is claimed is:

1. An autonomous rear-viewing sensor mount for a vehicle comprising:
   a bracket configured to fit the vehicle at an existing rear body structure of the vehicle, the bracket including mounts for sensors including at least one of a lidar and radar;
   the bracket further including reinforcement plate connections with extendable arms, the reinforcement plate connections including an s-shaped bend;
   wherein the mounts place the sensors in a rear-facing direction of the vehicle, and wherein the s-shaped bend determines a pitch angle of the sensors when the sensors are mounted on the mounts.

2. The autonomous rear-viewing sensor mount according to claim 1, wherein the bracket includes a mounting plate modularly attaching the mounts to different parts of the bracket.

3. The autonomous rear-viewing sensor mount according to c wherein existing rear body structure of the vehicle is a roof how reinforcement.

4. The autonomous rear-viewing sensor mount according to c wherein the existing rear body structure of the vehicle is a rear header reinforcement.

5. The autonomous rear-viewing sensor mount according to claim 1, wherein the bracket provides access from inside a cabin of the vehicle to the sensors.

6. The autonomous rear-viewing sensor mount according to claim 1, wherein the existing rear body structure of the vehicle is near a highest point of the vehicle.

7. A method of mounting an autonomous rear-viewing sensor mount for a vehicle comprising:
providing a bracket configured to fit the vehicle at an existing rear body structure of the vehicle, the bracket including mounts for sensors including at least one of a lidar and radar;
the bracket further including reinforcement plate connections with extendable arms, the reinforcement plate connections including an s-shaped bend;
wherein the mounts place the sensors in a rear-facing direction of the vehicle, and
wherein the s-shaped bend determines a pitch angle of the sensors when the sensors are mounted on the mounts;
removing a portion of an outer body of the vehicle, and attaching the bracket to the existing rear body structure of the vehicle at the removed portion.

8. The method of mounting the autonomous rear-viewing sensor mount for the vehicle according to claim 7, wherein the bracket includes a mounting plate modularly attaching the mounts to different parts of the bracket.

9. The method of mounting the autonomous rear-viewing sensor mount for the vehicle according to claim 7, wherein the existing rear body structure of the vehicle is a roof bow reinforcement.

10. The method of mounting the autonomous rear-viewing sensor mount for the vehicle according to claim 7, wherein the existing rear body structure of the vehicle is a rear header reinforcement.

11. The method of mounting the autonomous rear-viewing sensor mount for the vehicle according to claim 7, wherein the bracket provides access from inside a cabin of the vehicle to the sensors.

12. The method of mounting the autonomous rear-viewing sensor mount for the vehicle according to claim 7, wherein the bracket includes reinforcement plate connections with extendable arms.

13. The method of mounting the autonomous rear-viewing sensor mount for the vehicle according to claim 7, wherein the existing rear body structure of the vehicle is near a highest point of the vehicle.

14. A vehicle having an autonomous rear-viewing sensor mount, the vehicle comprising:
one or more sensors;
a bracket configured to fit the vehicle at an existing rear body structure of the vehicle, the bracket including mounts for the one or more sensors including at least one of a lidar and radar;
the bracket further including reinforcement plate connections with extendable arms, the reinforcement plate connections including an s-shaped bend,
wherein the mounts place the one or more sensors in a rear-facing direction of the vehicle, and
wherein the s-shaped bend determines a pitch angle of the one or more sensors when the one or more sensors are mounted on the mounts.

15. The vehicle of claim 14, wherein the bracket includes a mounting plate modularly attaching the mounts to different parts of the bracket.

16. The vehicle of claim 14, wherein the existing rear body structure of the vehicle is a roof bow reinforcement.

17. The vehicle of claim 14, wherein the existing rear body structure of the vehicle is a rear header reinforcement.

18. The vehicle of claim 14, wherein the bracket provides access from inside a cabin of the vehicle to the one or more sensors.

* * * * *